United States Patent [19]

Germanio

[11] 4,356,142

[45] Oct. 26, 1982

[54] INJECTION BLOW MOLDING PET PRODUCTS

[75] Inventor: Louis Germanio, Beesley's Point, N.J.

[73] Assignee: Wheaton Industries, Millville, N.J.

[21] Appl. No.: 181,787

[22] Filed: Aug. 27, 1980

[51] Int. Cl.$^3$ .............................................. B29C 17/07
[52] U.S. Cl. .................................... 264/537; 264/520
[58] Field of Search ................. 264/520, 537, 538, 523

[56] References Cited

U.S. PATENT DOCUMENTS 3,822,332  7/1974  Hrach et al. ........................ 264/537

Primary Examiner—Jan H. Silbaugh
Attorney, Agent, or Firm—Ratner & Prestia

[57] ABSTRACT

Method for injection blow molding transparent hollow objects from a polyethylene terephthalate melt comprises molding from a melt at 530°–575° F. into a parison, quickly and relatively uniformly cooled by parison mold elements, at 75°–150° F., to a temperature above the glass transition temperature of the melt. The parison is then immediately blown and cooled to temperature below the softening point of the melt, all in a manner to avoid crystallization and to produce a hollow PET object, typically a clear bottle.

3 Claims, No Drawings

INJECTION BLOW MOLDING PET PRODUCTS

This invention pertains to a method for injection blow molding hollow transparent objects, typically clear bottles, from polyethylene terephthalate (PET) resins.

Injection blow molding of hollow objects, particularly bottles, from a variety of thermoplastic resins is a well developed art. In injection blow molding (IBM), a parison or preform, typically tubular and closed at one end, is first injection molded about a mandrel or core rod. With the thermoplastic parison above its softening temperature, it is expanded, or blown, from within by compressed gas, typically air, into an outer shape determined by a blow mold.

In many prior art IBM processes involving resins other than PET, the parison, after it is formed and before it has hardened, is transferred by the core rod on which it is molded from the parison mold to the blow mold. Pressurized air is then introduced into the parison, through the core rod, to accomplish the blow molding operation.

In the past few years, it has become apparent that polyethylene terephthalate (PET) would be an ideal resin for many types of small bottles. Among its advantages are low cost, availability, and transparency, if formed properly. Defects in transparency arise from non-uniformities or inhomogenities in the molded PET, and for this reason, crystallization must be minimized or avoided. It is well known that crystallization can be substantially avoided, if the hot molded object is cooled very quickly through its recrystallization and glass transition zone. In this manner, transparent PET objects can be formed, i.e., objects with essentially no visible defects in transparency due to crystallization.

For PET, the glass transition temperature is about 163° F. and the recrystallization range extends up to about 270° F. Crystallization develops in proportion to the time during which the resin is within this zone, the crystallization rate being greatest at about 240°-260° F.

Because IBM requires the molded parison to be above its softening point to be blown, all known prior PET IBM processes, for producing transparent products, are designed to cool the injection molded parison quickly to a temperature well below both the glass transition and the softening temperatures of the PET, and then to temperature condition (re-heat) the parison back up to a temperature at which it can be blow molded.

Typically, this temperature conditioning, or re-heating, is combined with a mechanical working step, i.e., linear stretching or extension of the parison, just prior to blow molding to improve the physical properties of the product.

Inasmuch as these deep cooling and re-heating phases in prior art PET IBM processes (often referred to as "stretch and blow" processes) are time consuming and costly, it is apparent from their inclusion in prior art processes that these phases have heretofore been deemed necessary for high quality transparent products.

It is therefore the general object of the present invention to provide an improved injection blow molding process for making hollow, transparent PET products.

In particular, it is an object of this invention to provide a faster and more efficient process for injection blow molding of hollow, transparent PET products.

These objects are met by a process in which PET melt at 530°-575° F. is injection molded, with a core rod and parison mold cooled to 75°-150° F., to form a parison having a 0.075-0.200 inch wall thickness. After a 1-4 second dwell, this parison is removed from the parison mold with a surface temperature of 185°-245° F. and immediately transferred to a blow mold, cooled to 40°-60° F., where compressed gas, typically air, at 100-200 psi is admitted through the core rod to the parison which is thus quickly expanded into its final shape and cooled.

Preferably, the core rod outer surface temperature is 90°-120° F. prior to parison molding and the parison mold is cooled by an internal coolant at 80°-110° F. Preferably also, the parison wall thickness is 0.090-0.120 inches, the parison post-molding dwell time is 1.5-3 seconds, the parison surface temperature upon de-molding is 200°-220° F., the blow air pressure is 150-200 psi and the blow mold is cooled by an internal coolant at 35°-50° F.

The process of this invention is critically dependent upon quickly, and uniformly, cooling the molded parison from its melt temperature to a temperature above its glass transition temperature, and well above its softening temperature so that it is immediately blowable. The process then involves quickly transferring the parison to the blow mold and completing the molding and cooling stages. Thus intermediate re-heating, temperature conditioning and stretching phases are rendered unnecessary.

While this process is applicable to any of a wide variety of PET resins, three such commercially available resins which have been used with good results are (1) M-82 PET resin (0.85 intrinsic viscosity), as sold by American Hoechst of P.O. Box 5887 Spartanburg, S.C.; (2) Eastman 7352 (0.72 intrinsic viscosity) sold by Tennessee Eastman of Kingsport, Tenn.; and (3) No. 7202 CS (0.72 intrinsic viscosity) sold by Goodyear Tire & Rubber Co., Akron, Ohio.

It is also important in this process that the physical condition of the parison be kept substantially uniform in all parts of the parison throughout the process. Thus, in the injection molding of the parison, molding pressure must be applied in a controlled manner to avoid internal stress in the molding piece.

More importantly, the parison wall thickness, in general, should be substantially uniform to avoid temperature gradients within the parison upon cooling. Similarly, the core rod, the parison mold, and the blow mold should be designed for uniform temperature conditioning, such as by zoned coolant passageways within the molds. If a multicavity mold is used, the melt distribution manifold should be designed with zoned temperature control and multiple sensors also for optimum temperature uniformity.

Because the parison heat loss on its inner face depends on contact with the core rod, the temperature and heat properties of the core rod are also important. Core rod conditioning, such as by cooling prior to parison injection, is therefore highly desirable. This is accomplished preferably by circumferential impingement of chilled pressurized air in a closed chamber surrounding the core rod. Obviously, other cooling means may be employed and the coolant may be selectively directed to portions of the core rod which tend to be hotter or in which selectively more heat extraction from the parison is desired. Uniformity of temperature conditioning of the core rod and heat extraction by the core rod is also preferably enhanced by the use of a core rod material of high heat conductivity, such as a beryllium-copper alloy. For better wear, the core rod may be composed of dissimilar metals, the head which must fit tightly into the injection and blow molds, being formed of tool steel and the parison forming sleeve of the core rod being composed of the high heat capacity and thermal conductivity alloy.

Another expedient used to enhance uniformity of parison cooling is to avoid conductive heat loss from the parison mold to the injection nozzle. This is preferably accomplished by a retractible and spherical-face nozzle. The spherical face minimizes surface contact between the nozzle and the mold (while facilitating positioning of the nozzle in the mold) and the retraction of the nozzle, upon depressurization of the melt, reduces the effectiveness of the heat conductive contact between the nozzle and the mold.

By way of example, the method of the present invention may be used to produce a specific product as follows:

M-82 PET resin of American Hoechst (intrinsic viscosity 0.85) is formed into a melt with the melt temperature at the injection nozzle of 540° F., a tubular parison, oval in outer cross section, for an oval shaped bottle (parison dimensions: weight—25.5 grams; length—5.793 inches; wall thickness—0.100 tapering to 0.120 inches; core rod diameter—0.492 inches; outer diameters at shoulder—0.692 and 0.732 inches; outer diameters at heel—0.712 and 0.752 inches), is injection molded on a beryllium-copper alloy core rod, temperature conditioned to a substantially uniform surface temperature of about 110° F. The parison mold is substantially uniformly cooled by coolant at 80° F. passing through several individually controlled zones of passageways within the mold. The injection time is 2.5 seconds and the dwell time following injection is 2.2 seconds. The parison mold is then opened and the parison and core rod are "immediately" transferred (transfer time actually about 1.7 seconds) to a blow mold cooled substantially uniformly by coolant at 50° F. passing through several individually controlled zones of passageways within the blow mold. The parison is then "blown", by the admission of air through the core rod at 150-200 psi into an oval shape, narrow side 1.312 inches, outside diameter tapering to 1.800 inches at the heel, wide side 1.750 inches, outside diameter at shoulder tapering to 2.680 inches at heel (neck finish 28 mm diameter, 0.758 inches height), total length of product, 6.060 inches. The product is a substantially transparent (free of visible defects) PET oval bottle.

I claim:

1. A method for injection blow molding transparent hollow objects from a polyethylene terephthalate melt comprising:
   (a) cooling a parison mold and a core rod each to a preselected temperature in the range of 75°-150° F., injection molding from said melt at 530°-575° F. a parison in a mold shape formed by said core rod disposed centrally in a cavity of said parison mold, said parison having a wall thickness of 0.075-0.200 inches;
   (b) quickly and uniformly cooling said parison in a manner to avoid crystallization by holding said parison in said parison mold for 1-4 seconds while continuing to cool said injection mold to said preselected mold temperature, then removing said core rod and said parison from said parison mold with the outer surface of said parison at 185°-245° F.;
   (c) immediately transferring said core rod and parison to a blow mold at 40°-60° F. and introducing blow air at 100-200 psi through said core into the interior of said parison for a time period sufficient to blow said parison into the shape of said blow mold and quickly cool the blown shape also in a manner to avoid crystallization thereof.

2. A method as recited in claim 1, wherein just prior to said molding, said core rod outer surface is at a temperature of 90°-120° F. and said parison mold is cooled by an internal coolant at a temperature of 80°-110° F., said molded parison wall thickness is 0.090 0.120 inches, said holding time is 1.5-3 seconds, said parison outer surface temperature just prior to transfer is 200°-220° F., said blow mold pressure is 150-200 psi and said blow mold is cooled by an internal coolant at a temperature of 35°-50° F.

3. A method for injection blow molding transparent hollow objects from a polyethylene terephthalate melt comprising:
   (a) cooling a core rod and parison mold each to a preselected temperature below 150° F., and then injecting a portion of said melt into said parison mold while continuing to cool said mold to said preselected mold temperature to produce a parison at relatively uniform pressure and temperature;
   (b) said cooled core rod and parison mold quickly and uniformly cooling said parison to an intermediate temperature in a manner to avoid crystallization thereof such that the surface temperature of said parison is reduced within four seconds following completion of molding to a temperature in the range of 185°-245° F.;
   (c) then immediately blowing said parison into a final shape in a mold at sufficiently low temperature to quickly cool said blown shape to a temperature below the softening temperature of said melt, also in a manner to avoid crystallization thereof.

* * * * *

UNITED STATES PATENT AND TRADEMARK OFFICE
CERTIFICATE OF CORRECTION

PATENT NO. : 4,356,142

DATED : October 26, 1982

INVENTOR(S) : Louis Germanio

It is certified that error appears in the above-identified patent and that said Letters Patent is hereby corrected as shown below:

Column 4, line 29, "0.0900.120" should read -- 0.090-0.120 --.

Signed and Sealed this

Seventeenth Day of May 1983

[SEAL]

Attest:

DONALD J. QUIGG

Attesting Officer    Acting Commissioner of Patents and Trademarks

UNITED STATES PATENT AND TRADEMARK OFFICE
CERTIFICATE OF CORRECTION

PATENT NO. : 4,356,142
DATED : October 26, 1982
INVENTOR(S) : Louis Germanio

It is certified that error appears in the above—identified patent and that said Letters Patent is hereby corrected as shown below:

Cancel claim 3.

On the title page, "3 Claims, No Drawings" should read
-- 2 Claims, No Drawings --.

Signed and Sealed this

Twenty-sixth Day of November 1985

[SEAL]

Attest:

DONALD J. QUIGG

Attesting Officer

Commissioner of Patents and Trademarks